N. WATERMAN.
Coffee Pot.
No. 7,129.
Patented Feb. 26, 1850.
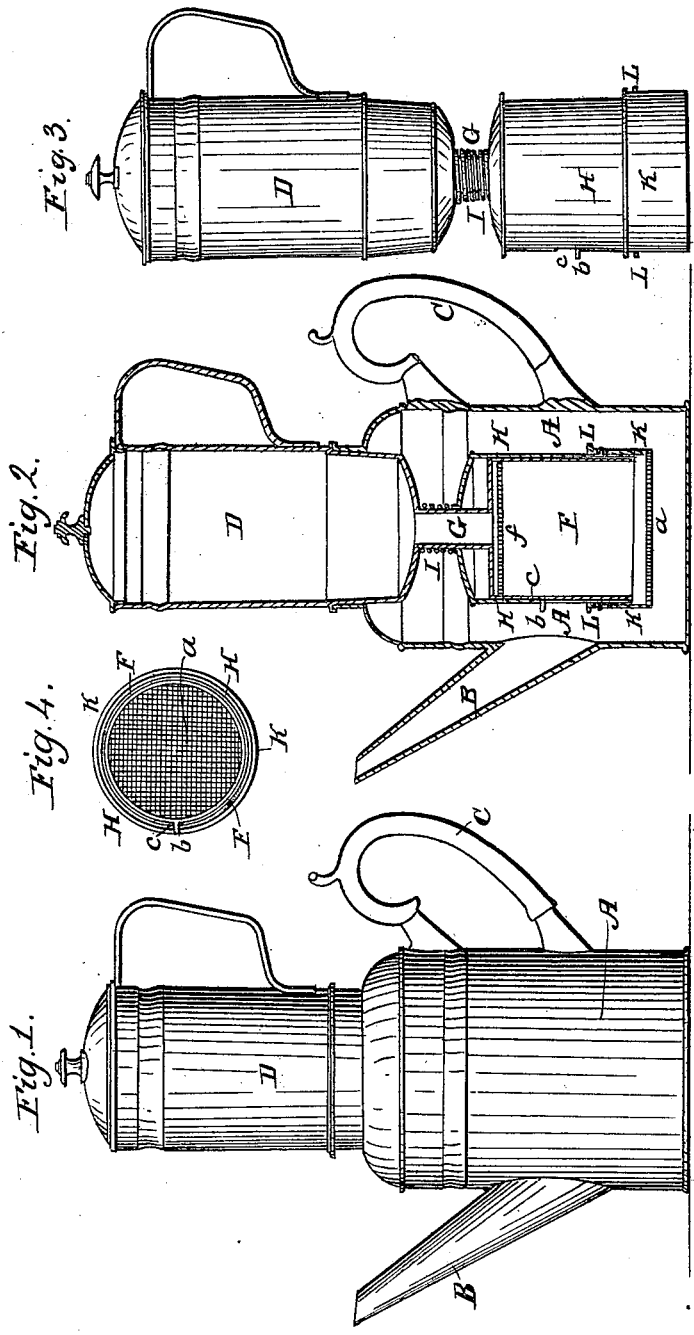

UNITED STATES PATENT OFFICE.

NATHANIEL WATERMAN, OF SUFFOLK COUNTY, MASSACHUSETTS.

APPARATUS FOR MAKING COFFEE.

Specification of Letters Patent No. 7,129, dated February 26, 1850.

*To all whom it may concern:*

Be it known that I, NATHANIEL WATERMAN, of the county of Suffolk and State of Massachusetts, have invented a new and useful Improvement in the Cafetière, or Apparatus for Making Decoctions of Coffee; and I do hereby declare that the nature of my said invention and the manner in which it is to be constructed and used are described and represented in the following specification and accompanying drawings, letters, figures, and references thereof.

Of the said drawings, Figure 1, denotes an external or side elevation of a cafetière constructed with my improvement. Fig. 2, is a vertical and central section thereof. Fig. 3, is an external view of the hot water reservoir, and coffee holder, as they appear when separated or removed from the lower reservoir or pot, which receives and holds the decoction.

The nature of my invention consists in combining with the coffee holder, which when in use is placed within the interior of the decoction pot, what I term a spring expander; the object or purpose of the same being to preserve the coffee when wet, in a close body, and at the same time, to afford to it room to expand without the production of such a condensation of it, as would tend to injuriously prevent the flowage, or percolation of the water through. Besides this my invention prevents to a very great degree if not entirely, the finer particles of the coffee from either being separated from the rest, and diffused into the decoction, or settling, on the strainer so as to clog the holes thereof, and impede the passage of the fluid or extract through the same.

In the drawings above mentioned A, represents the main coffee pot, or vessel for the reception of the extract or decoction of coffee, the said pot being furnished with an emptying spout or nose B, and a handle C, applied to it in the usual way. D, is the hot water reservoir or vessel, which is placed above the vessel A, and fitted thereto as seen in Figs. 1, and 2.

F, is the coffee holder or box, for containing the ground coffee, the same being arranged within the vessel A, and connected with the vessel D, by a tube G, and in such manner as to enable the hot water, which may be poured into the vessel D, to pass down through the said tube G, and into the coffee holder F.

The said box or coffee holder is open at bottom, and is surrounded or placed within another and larger box H, which slides freely on it and the tube G, and is connected to the lower end of a helical spring I, which encircles the tube G, and is fastened at its uper end to the said tube, the whole being as seen in Figs. 2, and 3.

The lower end of the box H, is provided with a cover K, which fits closely upon it, and may be held in place, either by means of a bayonet catch as seen at L, in Fig. 3, or by any other proper contrivance. The bottom *a*, of the cover is punctured with numerous holes, so as to constitute it a strainer. In order to prevent the box H, from turning round on the box F, a small stud *b*, is made to project from the latter, and to pass through a long slot *c*, cut through the side of the former as seen in Fig. 2 and in Fig. 4, which is a section of the two boxes taken through the stud. Within and across the upper part of the box F, is a perforated partition or strainer *f*, the same being placed very near to the top of the box.

The operation of my invention is as follows: The box F, being charged with ground coffee to the extent required, the cover K, is next put in place, and the apparatus affixed to the coffee pot, as seen in Fig. 2. Boiling or very hot water is next to be poured into the vessel D. From the said vessel D, it will descend through the tube G, and strainer *f*, and pass into the mass of coffee within the box F, which on becoming saturated with water generally swells to a very great degree, and by its action against the strainers *f*, and *a*, it will press the latter in a direction away from the former; the spring I, and box H, allowing this to take place, the contractile power of the spring being made such as not only to be overcome by the expansive force of the mass of coffee, but to present to such expansive force such a resistance as may be necessary to preserve the mass at the proper density; that is one which while it will permit the water to pass through the coffee with the required velocity, it will so confine the finer particles of the coffee, as to prevent them in a very great measure if not entirely, from being carried through the mass, and settling upon the strainer, or being diffused within the decoction in the vessel A.

The strainer *a*, and its spring contrivance, in their application to the coffee receptacle or box, constitute what I have termed the spring expander, and in the employment of the same I do not intend to confine my invention to the precise form or arrangement of parts as exhibited in the drawings, as I am aware that the same may be varied in various ways, while the principle of the invention is still maintained. For instance the spring may be placed between the tops of the two boxes F, and H, instead of on the outside of the top of the box H, as seen in the drawings. The spring expander may be disposed within the box F, but I do not consider such change as presenting the advantages of construction, operation and repair, as are presented by the mode of making the improved cafetière, as exhibited in the drawings.

What therefore I claim as my invention, and as new, is—

The spring expander in combination with the coffee box or receptacle, the same being for the object or purpose, substantially, as herein before specified.

In testimony whereof I have hereto set my signature this twenty seventh day of November A. D. 1849.

NATH. WATERMAN.

Witnesses:
R. H. EDDY,
CALEB EDDY.